(12) United States Patent
Barrett

(10) Patent No.: US 10,231,435 B2
(45) Date of Patent: Mar. 19, 2019

(54) PET TOY

(71) Applicant: Marilyn Barrett, Los Angeles, CA (US)

(72) Inventor: Marilyn Barrett, Los Angeles, CA (US)

(*) Notice: Subject to any disclaimer, the term of this patent is extended or adjusted under 35 U.S.C. 154(b) by 490 days.

(21) Appl. No.: 15/053,896

(22) Filed: Feb. 25, 2016

(65) Prior Publication Data
US 2017/0245468 A1  Aug. 31, 2017

(51) Int. Cl.
*A01K 15/02* (2006.01)

(52) U.S. Cl.
CPC .......... *A01K 15/024* (2013.01); *A01K 15/025* (2013.01)

(58) Field of Classification Search
CPC ...... A01K 15/024; A01K 15/02; A01K 15/025
USPC .......................................................... 119/706
See application file for complete search history.

(56) References Cited

U.S. PATENT DOCUMENTS

| 1,202,190 | A |   | 10/1916 | Kern |            |
|-----------|---|---|---------|------|------------|
| 1,561,725 | A | * | 11/1925 | Kerley | B43K 29/12 |
|           |   |   |         |      | 40/334     |
| 2,005,817 | A |   | 6/1935  | Yoder |           |
| 2,060,676 | A |   | 11/1936 | Kuyper |          |
| 2,111,362 | A | * | 3/1938  | Fisher | B43K 29/0875 |
|           |   |   |         |      | 242/379    |
| 2,419,798 | A |   | 4/1947  | Stone |           |
| 2,493,893 | A |   | 1/1950  | Miller |          |
| 2,707,595 | A |   | 5/1955  | Brown |           |
| 2,731,229 | A |   | 1/1956  | Seitz |           |
| 2,827,116 | A |   | 3/1958  | Zalovcik |        |
| 2,894,487 | A |   | 7/1959  | Goldson |         |
| 2,997,019 | A |   | 8/1961  | Bryson |          |
| 3,370,805 | A |   | 2/1968  | Barbee |          |

(Continued)

FOREIGN PATENT DOCUMENTS

| CN | 203188881 | 9/2013 |
| EP | 1925773   | 7/2009 |
| KR | 101370217 | 3/2014 |

OTHER PUBLICATIONS

PCT, Written Opinion of the International Searching Authority, International Application No. PCT/US2017/014514, International Filing Date Jan. 23, 2017.

(Continued)

*Primary Examiner* — Monica L Williams
*Assistant Examiner* — Aaron M Rodziwicz
(74) *Attorney, Agent, or Firm* — Hankin Patent Law, APC; Kevin Schraven; Anooj Patel

(57) ABSTRACT

A pet toy. The pet toy may comprise: a base, roller assembly, return coil, and flexible sheet. The base may comprise a first arm portion and a second arm portion disposed in parallel relation. The first arm portion may comprise a first receiving cavity, and the second arm portion may comprise a second receiving cavity. The first receiving cavity may engage with a first end of the roller assembly, and the second receiving cavity may engage with a second end of the roller assembly to hold and rotatably secure the roller assembly. The roller assembly may comprise a flap hingedly coupled to the roller assembly. The flap may be adapted to grasp a portion of the flexible sheet. The return coil may be coupled to the base and the roller assembly and may bias and rotate the roller assembly back towards its original position when the roller assembly is rotated.

20 Claims, 10 Drawing Sheets

(56) References Cited

U.S. PATENT DOCUMENTS

| | | | |
|---|---|---|---|
| 3,604,397 A | 9/1971 | Salerno | |
| 3,727,583 A | 4/1973 | Muraro | |
| 3,916,838 A | 11/1975 | Swart | |
| 3,963,188 A | 6/1976 | DiVeto | |
| 4,008,863 A * | 2/1977 | Fohl | B60R 22/34 242/376 |
| 4,344,583 A | 8/1982 | Drum | |
| 4,373,682 A | 2/1983 | Dickson | |
| 4,611,556 A | 9/1986 | Frank | |
| 4,767,074 A | 8/1988 | Bower | |
| 4,996,946 A | 3/1991 | Olson | |
| 5,067,440 A | 11/1991 | Hatten | |
| 5,113,795 A | 5/1992 | Delzio | |
| 5,275,127 A | 1/1994 | Leopold | |
| 5,275,128 A | 1/1994 | Barnes | |
| 5,474,026 A | 12/1995 | Wohltjen | |
| 5,630,563 A * | 5/1997 | Meisner | B65H 35/002 225/43 |
| 5,775,263 A | 7/1998 | Richards | |
| 6,021,741 A | 2/2000 | Krietzman | |
| 6,786,377 B1 | 9/2004 | Holden | |
| 7,165,688 B2 | 1/2007 | Cameron | |
| 7,171,922 B2 | 2/2007 | Lipscomb | |
| 7,195,020 B2 | 3/2007 | Bird | |
| 7,431,526 B2 * | 10/2008 | Lin | B43K 29/12 242/550 |
| 8,327,806 B2 | 12/2012 | Haaf | |
| 2004/0065416 A1 * | 4/2004 | Auger | E06B 9/26 160/84.05 |
| 2005/0211185 A1 | 9/2005 | Jenkins | |
| 2010/0294438 A1 * | 11/2010 | Kirby | E06B 9/262 160/84.04 |
| 2011/0253060 A1 | 10/2011 | Schotthoefer | |
| 2012/0018483 A1 | 1/2012 | Matsumura | |
| 2012/0090552 A1 | 4/2012 | Haaf | |
| 2015/0068010 A1 * | 3/2015 | Klingler | F16B 2/185 29/426.1 |
| 2015/0107520 A1 | 4/2015 | Durnen | |

OTHER PUBLICATIONS

Petsmart, Martha Stewart Pets Rolling Cat Scratcher, Catalog, United States http://www.petsmart.com/cat/scratchers/martha-stewart-pets-rolling-cat-scratcher-zid36-5211326/cat-36-catid-200086.

Amazon, Rolling / Roller Sisal Rope Small Cat Scratcher / Scratching Post, Catalog, United States http://www.amazon.co.uk/Rolling-Roller-Cat-Scratcher-Scratching/dp/B00BDUP2FE.

Toilet Partitions, Bobrick B-2730 Toilet Paper Dispenser, Catalog, United States http://toiletpartitions.com/bobrick-b-2730-toilet-paper-dispenser.html?gclid=CLyfg8fSmMkCFUiEfgodcMMMtA.

* cited by examiner

PET TOY

FIELD OF USE

The present disclosure relates generally to recreational and amusement devices for domestic animals, and more specifically, to entertaining and exercising devices for pets such as cats.

BACKGROUND

Many house cats tend to be underactive and overweight. Like people, a domestic pet cat benefits from regular exercise and an active lifestyle. Exercise is essential for a pet's physical health as it relieves stress and boredom and keeps the pet feeling healthy, satisfied, and emotionally balanced.

To induce exercise and combat boredom, a pet owner often introduces a pet toy to the environment. Pet toys are generally any object or device used to entertain a pet and are generally constructed of durable materials such as pigskin, natural rubber and latex. Pet toys can also provide exercise and can help reduce depression, which often occurs in cats when left alone while family members are away from the home.

Unfortunately, standard conventional pet toys are often mundane and frequently fail to continuously stimulate the pet. As a result, many pet cats tend to be bored after extended use of a pet toy. For example, pet toys resembling a mouse or rodent are generally passive, and as a result, are only movable through the toy being thrown by the pet owner or upon being moved by the pet itself.

Thus, there remains a long-felt and as of yet unmet need to provide a new and improved pet toy capable of entertaining a cat by eliciting or stimulating the attention of the pet. Preferably, the pet toy is simple and requires minimal human intervention and maintenance.

SUMMARY OF EMBODIMENTS

To minimize the limitations in the prior art, and to minimize other limitations that will become apparent upon reading and understanding the present disclosure, the present specification discloses a new and improved pet toy.

One embodiment may be a pet toy, comprising: a base; a roller assembly; a return coil; and a flexible sheet. The base portion may be configured to engage with the roller assembly, such that the roller assembly is rotatably held by the base. The roller assembly may be configured to securely hold the flexible sheet, such that the flexible sheet, when pulled, causes the roller assembly to rotate. The return coil may be connected to the base and the roller assembly, such that the return coil allows the roller assembly to rotate and then return to a resting position.

Another embodiment may be a pet toy, comprising: a base; a roller assembly; and a return coil; wherein the base may comprise a first arm portion and a second arm portion disposed in parallel relation; wherein the first arm portion may comprise a first receiving cavity; wherein the second arm portion may comprise a second receiving cavity; wherein the first receiving cavity may be adapted to engage with a first end of the roller assembly and wherein the second receiving cavity may be adapted to engage with a second end of the roller assembly, such that the first arm portion and the second arm portion may be adapted to hold and rotatably secure the roller assembly; wherein the roller assembly may comprise a flap hingedly coupled to an outer curved surface of the roller assembly; wherein the flap may be adapted to grasp a portion of a flexible sheet; and wherein the return coil may be coupled to the base and the roller assembly and may be adapted to bias and rotate the roller assembly back towards its original position when the roller assembly is rotated. The roller assembly may comprise a plurality of teeth disposed along an underside of the flap; wherein the plurality of teeth may be adapted to engage the flexible sheet. The flexible sheet may comprise a plurality of holes adapted to receive the plurality of teeth of the roller assembly; and wherein, when the flap of the roller assembly is closed and when the plurality of teeth is engaged with the plurality of holes of the flexible sheet, the flexible sheet may be coupled and secured to the roller assembly. The roller assembly may comprise a slot; wherein the flap may comprise a lip; and wherein the lip may be adapted to engage with the slot when the flap is closed. The roller assembly may further comprise: a main roller and a roller stub; wherein the main roller may be adapted to engage with the roller stub; and wherein the roller stub may be adapted to couple with the return coil. The roller assembly may further comprise a locking mechanism; wherein the locking mechanism may be adapted to secure the main roller to the roller stub. The second arm portion of the base may comprise a cover for housing the return coil. The roller stub may comprise a cover for housing the return coil. The base may comprise one or more fastener holes; wherein the one or more fastener holes may be adapted to receive one or more fasteners for mounting the base to a surface. The base may comprise a U-shaped clamp portion and a clamping screw; wherein the clamp portion and clamping screw may be adapted to clamp the base onto an edge of a surface.

Another embodiment may be a pet toy, comprising: a base; a roller assembly; a return coil; and a flexible sheet; wherein the base may comprise a first arm portion and a second arm portion disposed in parallel relation; wherein the first arm portion may comprise a first receiving cavity; wherein the second arm portion may comprise a second receiving cavity; wherein the first receiving cavity may be adapted to engage with a first end of the roller assembly and wherein the second receiving cavity may be adapted to engage with a second end of the roller assembly, such that the first arm portion and the second arm portion are adapted to hold and rotatably secure the roller assembly; wherein the roller assembly may comprise a flap hingedly coupled to an outer curved surface of the roller assembly; wherein the flap may be adapted to grasp a portion of the flexible sheet; and wherein the return coil may be coupled to the base and the roller assembly and may be adapted to bias and rotate the roller assembly back towards its original position when the roller assembly is rotated. The roller assembly may further comprise a plurality of teeth disposed along an underside of the flap; wherein the plurality of teeth may be adapted to engage the flexible sheet. The flexible sheet may comprise a plurality of holes adapted to receive the plurality of teeth of the roller assembly; wherein the plurality of holes may be disposed in a configuration substantially similar to the plurality of teeth, such that the plurality of teeth directly and matingly engages with the plurality of holes; and wherein, when the flap of the roller assembly is closed and when the plurality of teeth is engaged with the plurality of holes of the flexible sheet, the flexible sheet may be coupled and secured to the roller assembly. The roller assembly may comprise a slot; wherein the flap may comprise a lip; and wherein the lip may be adapted to engage with the slot when the flap is closed. The roller assembly may further comprise: a main roller and a roller stub; wherein the flap may be hingedly coupled to the main roller; wherein the main roller may be adapted to engage with the roller stub; and wherein the roller stub may be adapted to couple with the return coil. The roller assembly may further comprise a locking pin; wherein the locking pin may be adapted to secure the main roller to the roller stub. The second arm portion of the base may comprise a cover for housing the return coil. The roller stub may comprise a cover for housing the return coil. The base may comprise one or more fastener holes; wherein the one or more fastener holes may be adapted to receive one or more fasteners in order to mount the base to a surface. The base may comprise a U-shaped clamp portion and a clamping screw; wherein the U-shaped clamp portion and clamping screw may be adapted to clamp the base onto an edge of a surface.

The present disclosure discloses a new and improved pet toy. The pet toy preferably comprises a base coupled to a surface and a roller assembly coupled to the base. A flexible sheet is preferably coupled or attached to the roller assembly, such that the flexible sheet is dangling or suspended from the roller assembly. The flexible sheet is preferably exposed and accessible to a pet such as a cat. The pet may bat or scratch the exposed flexible sheet, thereby causing the roller assembly to rotate. However, after rotation of the roller assembly due to the pet's batting, the return spring preferably retracts the roller assembly back to its original position. This reactive motion by the pet toy elicits the attention of the pet and stimulates the pet to continuously pull, bat, or scratch, the flexible sheet.

It is an object to overcome the deficiencies of the prior art.

These, as well as other components, steps, features, objects, benefits, and advantages, will now become clear from a review of the following detailed description of illustrative embodiments, of the accompanying photographs, and of the claims.

BRIEF DESCRIPTION OF THE ILLUSTRATIVE EMBODIMENTS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE ILLUSTRATIVE EMBODIMENTS

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description of embodiments. The following embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

As used herein, according to the present disclosure, the term "pet" refers any domestic or tamed animal kept for companionship or pleasure and treated with care and affection such as dogs and cats.

As used herein, the term "flexible sheet" refers to any thin piece of flexible material such as cotton, linen, paper, plastic, polymers, and the like. The "flexible sheet" may be constructed of durable material and may take various shapes, including without limitation: rectangular, circular, triangular, square, oblong, elliptical, trapezoidal, spherical, parallelogram, octagon, oval, pentagon, and non-geometrical shapes.

Figure 1:
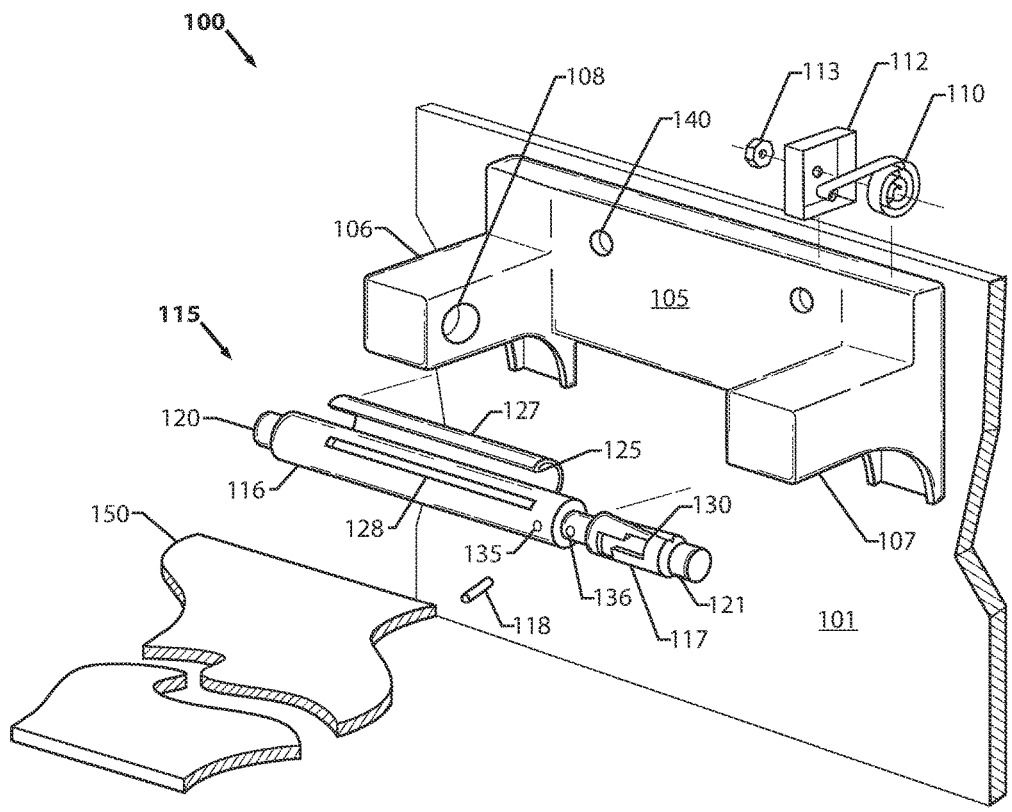
FIG. 1 is an exploded-perspective view of one embodiment of a pet toy.

FIG. 1 is an exploded-perspective view of one embodiment of a pet toy. As shown in FIG. 1, one embodiment of a pet toy 100 may comprise: a base 105, a return coil 110, a roller assembly 115, and a flexible sheet 150. The base 105 is generally any structure used to provide support for the pet toy 100 and may comprise a first arm portion 106 and a second arm portion 107, preferably disposed in parallel relation to each other. The first arm portion 106 may comprise a first receiving cavity 108, and the second arm portion 107 may comprise a second receiving cavity 109 (shown in FIG. 4). The first receiving cavity 108 is adapted to engage with a first end 120 of the roller assembly 115, whereas the second receiving cavity 109 is adapted to engage with a second end 121 of the roller assembly 115. This will preferably allow the first arm portion 106 and second arm portion 107 to hold and secure the roller assembly 115. In a preferred embodiment, the roller assembly 115 is adapted to turn or rotate at an axis perpendicular to the first arm portion 106 and second arm portion 107.

FIG. 1 also shows that the base 105 may comprise one or more fastener holes 140. The fastener hole 140 is generally a drill hole or hole adapted for receiving and securing a fastener (e.g., nail) for mounting and affixing the base 105 onto a vertical surface such as a wall. Alternatively, the base 105 may also comprise a clamp portion 210 and a clamping screw 209 (both shown in FIG. 9). The clamp portion 210 and clamping screw 209 are preferably adapted to clamp the base 105 onto an edge of a horizontal surface such as a table ledge or edge.

FIG. 1 also shows that the pet toy 100 may comprise a roller assembly 115. The roller assembly 115 is preferably used to hold and secure the flexible sheet 150 onto the base 105 of the pet toy 100. The roller assembly 115 is also preferably used to roll, rotate, and/or wind/unwind the flexible sheet 150 towards and away from the base 105. In one embodiment, the roller assembly 115 may comprise a main roller 116, roller stub 117, and locking mechanism (e.g., a locking pin 118). The main roller 116 is preferably adapted to mate and engage with the roller stub 117 for installation purposes. Specifically, the user, for instance, may disassemble the roller assembly 115 into multiple smaller pieces and may install the roller assembly 115 into the base 105 by reassembling the roller assembly 115 into a single piece. Preferably, cylindrical end portions 120, 121, which generally protrude on the sides of the roller assembly 115, engage with the receiving cavities 108, 109 of the arm portions 106, 107. A locking mechanism or locking pin 118 may also be inserted in hole 135 of the main roller 116 and hole 136 of the roller stub 117 in order to secure the main roller 116 to the roller stub 117.

The main roller 116 may also comprise a flap 125 and a slot 128. The flap 125 is preferably coupled to the outer surface of the main roller 116 via a hinge 801 (shown in FIG. 8) and may comprise a lip 127 that engages with the slot 128 when the flap 125 is closed. In one embodiment, the flap 125 is preferably a curved piece that is hingedly connected to the main roller 116 for grasping a portion or end of the flexible sheet 150. The flexible sheet 150 is generally a thin piece of flexible, durable material used for contact and interaction with the pet. The flexible sheet 150 may be constructed of fabric such as cotton or linen or may be constructed of other materials such as paper, plastic, polymers, and the like. The flexible sheet 150 may also be created in various shapes, including without limitation: rectangular, circular, triangular, square, oblong, elliptical, trapezoidal, spherical, parallelogram, octagon, oval, pentagon, and non-geometrical shapes. The flexible sheet 150 may be kept in place by friction by the lip 127 of the flap 125. The hinge 801 may be a living hinge. The flexible sheet 150 may be removable from said roller assembly 115 so that it can be easily washed or replaced.

Furthermore, FIG. 1 shows that the pet toy 100 may also comprise a return coil 110. The return coil 110 is preferably any mechanical winding, spiral, spring, or concentric rings used to store energy (when winded) and is adapted to bias and return the roller assembly back towards an original position when the roller assembly 115 is rotated by a pet pulling on the flexible sheet 150. The return coil allows the roller assembly 115 to be rotated from a resting position. Preferably the return coil dynamically springs back the flexible sheet 150, such that the pet might believe that the pet toy is alive. In this manner, the pet is more engaged and will spend more time playing with the pet toy 100. Preferably, one end of the return coil 110 is coupled to the base 105 while the other end of the return coil 110 is coupled to the roller assembly 115. In one embodiment, the return coil 110 may be housed in a cover 112 via a fastener 113, and one end of the return coil 110 may be coupled directly to the opening 130 of the roller stub 117 of the roller assembly 115. Alternatively, in another embodiment, the roller stub 117 (or main roller 116) may also comprise a housing for the return coil 110.

Figure 2:
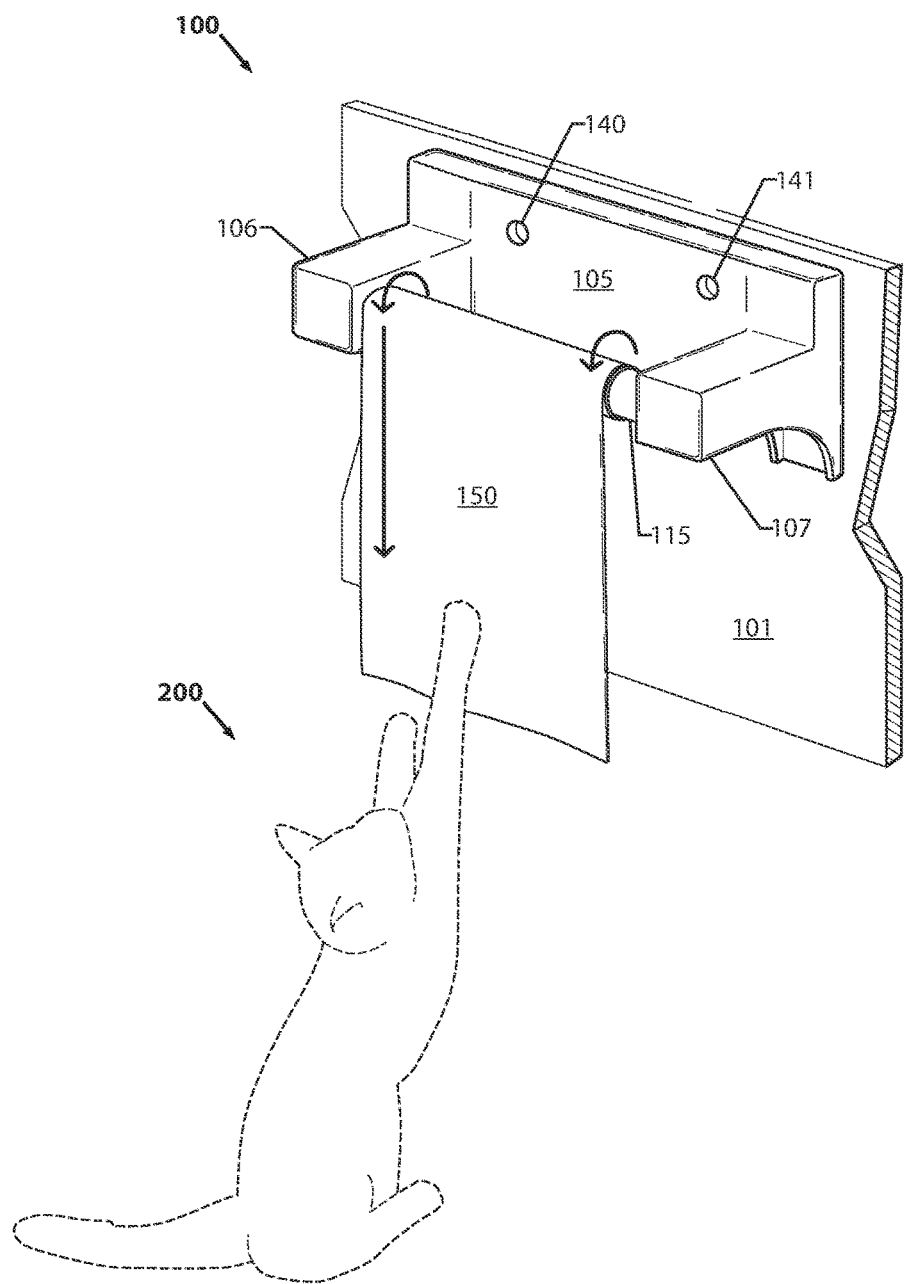
FIG. 2 is a perspective view of one embodiment of the pet toy and shows the flexible sheet pulled by a pet.

FIG. 2 is a perspective view of one embodiment of the pet toy and shows the flexible sheet in a state of being pulled by a pet. As shown in FIG. 2, one embodiment of a pet toy 100 may comprise: a base 105, roller assembly 115, and a flexible sheet 150. Importantly, FIG. 1 shows that the base 105 may hold and secure the roller assembly 115 via the arm portions 106, 107, but may allow the roller assembly 115 to rotate while secured in place. Additionally, the flexible sheet 150 is preferably secured to the roller assembly 115 and is generally suspended when the roller assembly 115 is secured to the arm portions 106, 107 of the base 105.

FIG. 2 also shows how the pet toy 100 may be used by a pet 200. As shown in FIG. 2, the pet toy 100 may be mounted on a wall 101 or similar surface, preferably just higher than a line of sight of the pet 200 and may be mounted via fasteners and mounting holes 140, 141. Alternatively, the base 105 may be coupled to a horizontal surface via an adhesive, or other mechanism, such as a clamping portion and clamping screw (see FIG. 5). While mounted on the surface, a flexible sheet 150 is preferably coupled or attached to the roller assembly 115. This will preferably allow the flexible sheet 150 to be suspended and dangle or hang down from the roller assembly 115. The flexible sheet 150 is an inviting target, which may move or flutter with pressure changes or a breeze. As a result of this, the pet 200 may strike, bat, or otherwise pull the flexible sheet 150 toward the ground. When caught and pulled by a pet, the flexible sheet 150 may wind the roller assembly 115 in a clockwise rotation (or counter-clockwise, depending upon the configuration of the return coil 110) and may wind the return coil 110. Once the flexible sheet 150 is pulled, the return coil 110 may then rotate the roller assembly 115 back to its original position when the flexible sheet is released by the pet, thereby pulling the flexible sheet 150 away from the ground. This process may repeat whenever the pet strikes, bats, or pulls the flexible sheet 150 downwards. The wind back motion is preferably jerky motion that is unexpected and thus interesting to the pet.

Figure 3:
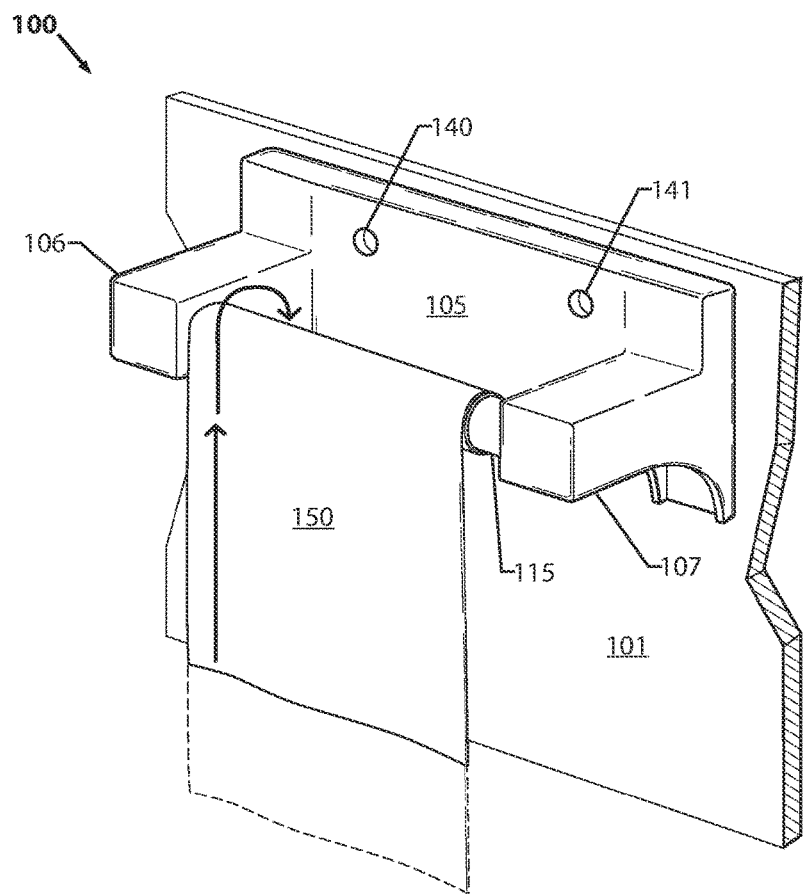
FIG. 3 is a perspective view of one embodiment of the pet toy and shows the flexible sheet retracted to its original position after being pulled by the pet.

FIG. 3 is a perspective view of one embodiment of the pet toy and shows the flexible sheet retracted to its original position after being pulled by the pet. As shown in FIG. 3, one embodiment of a pet toy 100 may comprise: a base 105, roller assembly 115, and a flexible sheet 150. FIG. 3 shows the flexible sheet 150 in a resting portion after just having rotated upwards after the flexible sheet 150 was pulled downward by the pet. Specifically, once the flexible sheet 150 is pulled downwards, the return coil 110 may rotate the roller assembly 115 back to its original resting position, which pulls the flexible sheet 150 upwards or away from the ground. This process may repeat whenever the pet strikes, bats, or pulls the flexible sheet downwards. Preferably the return coil 110 is sensitive to each bat or strike, such that the flexible sheet 150 is caused to jiggle or move in a dynamic and unpredictable manner.

Figure 4:
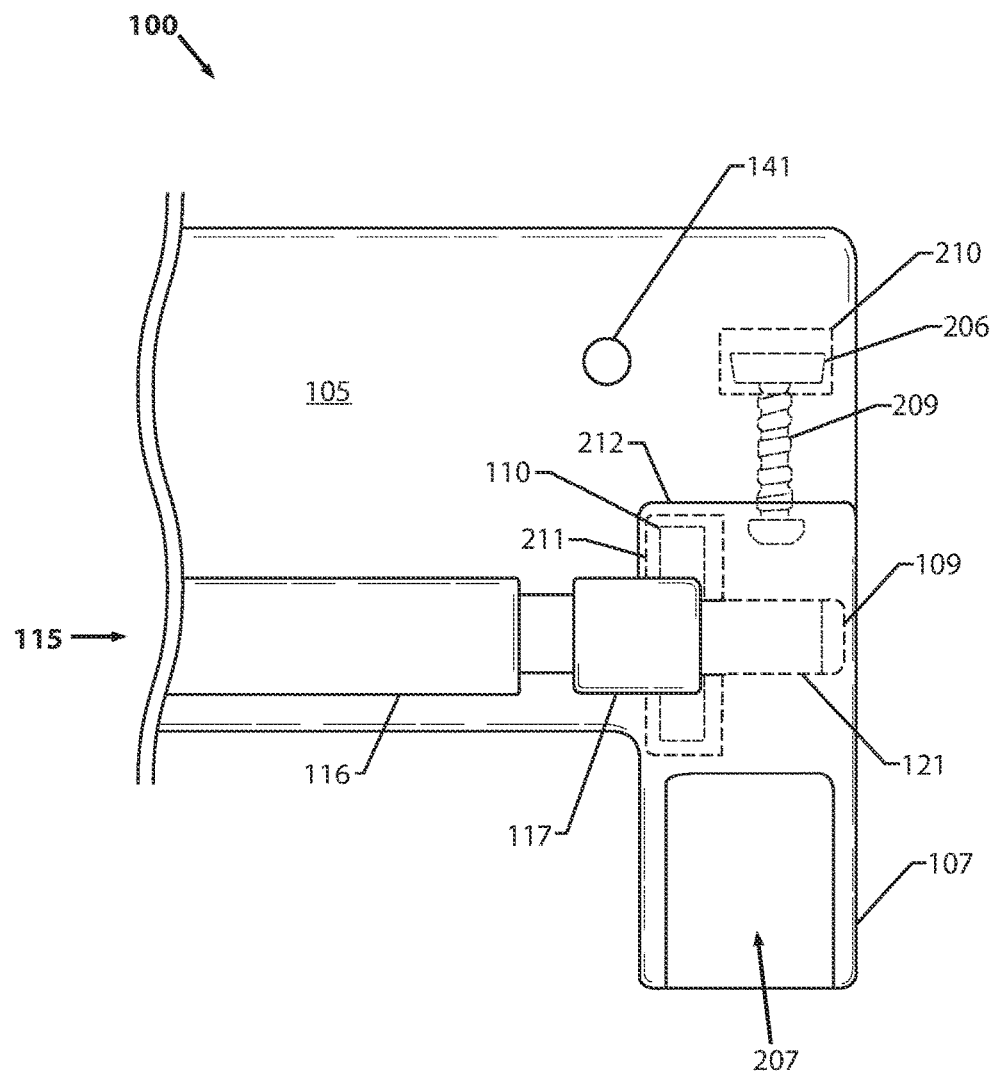
FIG. 4 is a portion of a front view of one embodiment of the pet toy without the flexible sheet.

FIG. 4 is a portion of a front view of one embodiment of the pet toy without the flexible sheet. As shown in FIG. 4, one embodiment of the pet toy 100 may comprise a base 105, main roller 115 and return coil 110. As discussed above, the base 105 may comprise a fastener hole 141 for mounting the base 105. The base 105 may also comprise a clamping portion 210 and clamping screw 209 for engaging and clamping the base 105 onto a horizontal surface (e.g., edge or ledge of a table). A screw pad 206 may also be used in conjunction with the clamping screw 209. In order to access the head portion of the clamping screw 209, the base 105 may further comprise a through hole 207 that allows a user to access the head portion of the clamping screw 209.

FIG. 4 also shows that the second arm portion 107 of the base 105 may comprise a receiving cavity 109. The receiving cavity 109 may be adapted to receive an end portion of the roller stub 117 such as a cylindrical portion 121 and allow the roller assembly 115 to rotate in a controlled manner. In one embodiment, the arm portion 107 may also comprise a cover 212 for housing the return coil 110. Specifically, the return coil 110 may be positioned within the interior space 211 of the cover 212 of the second arm portion 107 and may be coupled to the roller stub 117 to provide bias for the roller assembly 115. Although FIG. 4 shows the return coil 110 housed within a cover 212 of the base 105, the return coil 110 may be housed within other areas of the pet toy 100 such as the first arm portion 106 or roller assembly 115.

Figure 5A:
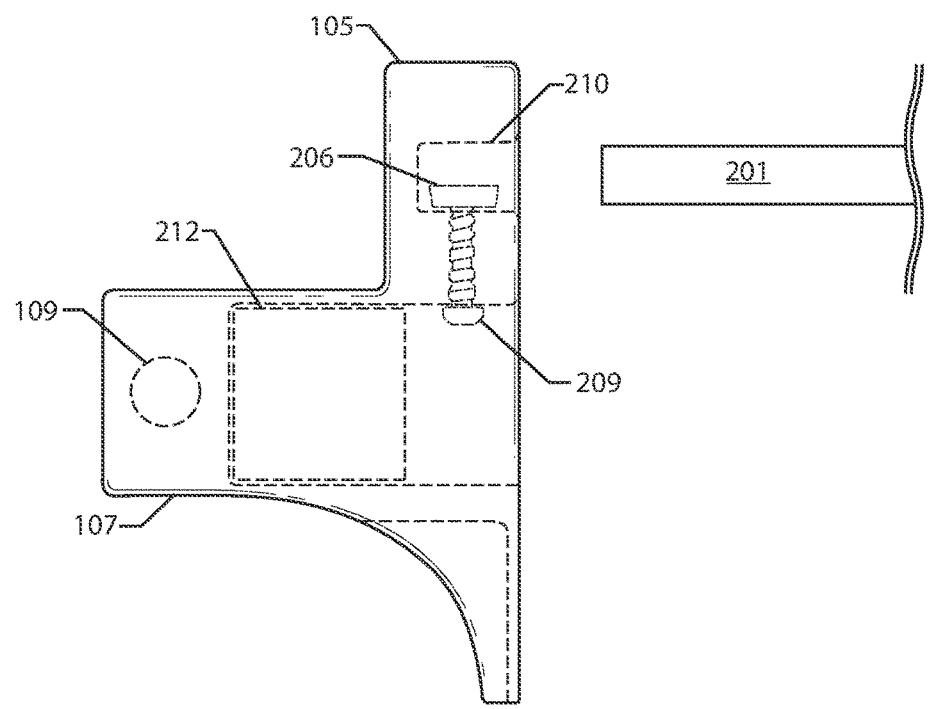
FIG. 5A is a side view of one embodiment of the pet toy without the flexible sheet and shows how the pet toy may fasten onto a ledge.

FIG. 5A is a side view of one embodiment of the pet toy without the flexible sheet and shows how the pet toy may fasten onto a ledge. As shown in FIG. 5A, one embodiment of the pet toy 100 may comprise a base 105, wherein the base 105 may comprise a second arm portion 107 and cover 212. The second arm portion 107 may comprise a receiving cavity 109 for receiving the cylindrical portion 121 of the roller assembly 115.

In some embodiments, the base 105 may comprise a clamping portion 210 and a clamping screw 209. The clamping portion 210 is preferably U-shaped and may comprise a receiving portion adapted to engage with a horizontal surface 201 such as a ledge. The screw pad 206 may also be used to prevent scratching and markings onto the horizontal surface 201. Once engaged to the base 105, the horizontal surface 201 may be secured to the base 105 via the clamping screw 209. This will preferably allow the base 105 to be mounted to a horizontal surface 201 or ledge.

Figure 5B:
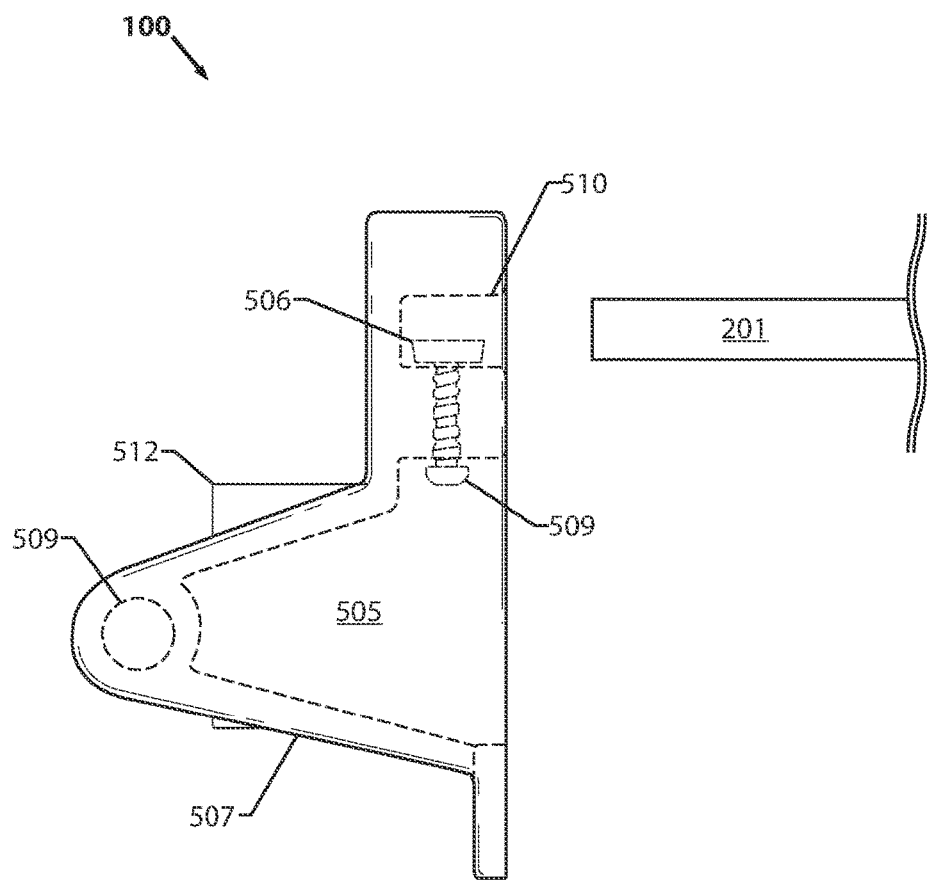
FIG. 5B is a side view of another embodiment of the pet toy without the flexible sheet and shows the base with triangular arm portions.

FIG. 5B is a side view of another embodiment of the pet toy without the flexible sheet and shows the base with triangular arm portions. As shown in FIG. 5B, another embodiment of the pet toy may comprise a base 505 with triangular arm portions such as the second arm portion 507. The base 505 may also comprise a cover 512. The second arm portion 507 may comprise a receiving cavity 509 for receiving the cylindrical portion 521 of the roller assembly 515.

Another embodiment of the base 505 may comprise a clamping portion 510 and a clamping screw 509. The clamping portion 510 is preferably U-shaped and may comprise a receiving portion adapted to engage with a horizontal surface 201 such as a ledge. The screw pad 506 may also be used to prevent scratching and markings onto the horizontal surface 201. Once engaged to the base 505, the horizontal surface 201 may be secured to the base 505 via the clamping screw 509. This will preferably allow the base 505 to be mounted to a horizontal surface 201 or ledge.

Figure 6:
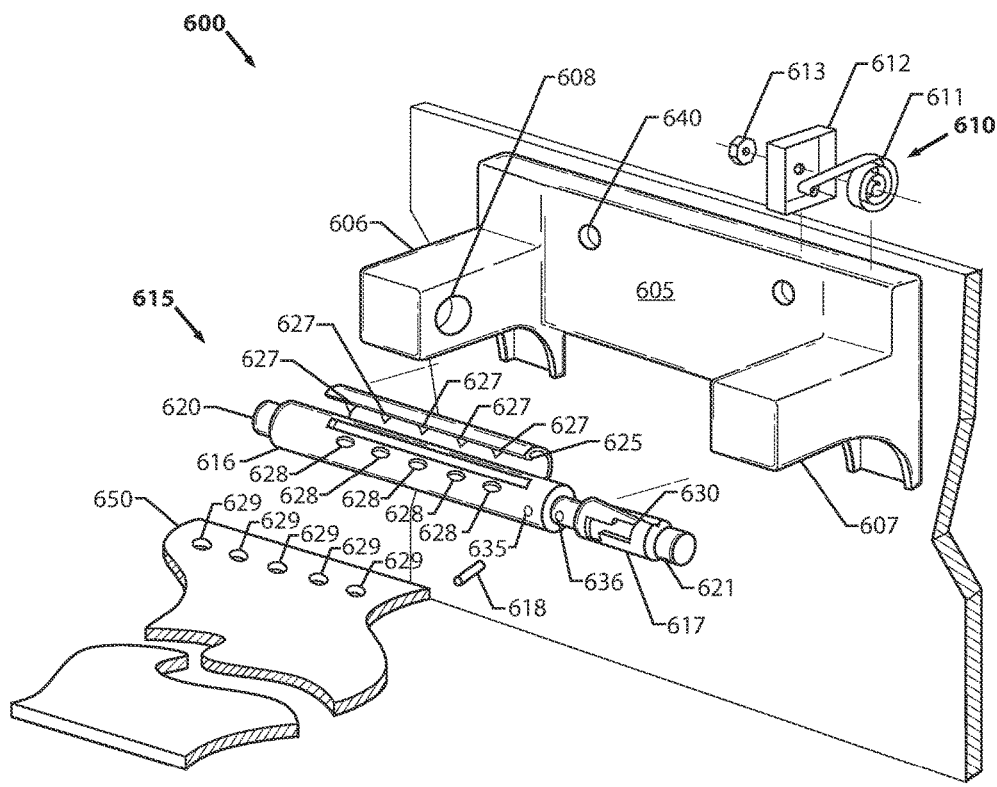
FIG. 6 is an exploded-perspective view of another embodiment of the pet toy.

FIG. 6 is an exploded-perspective view of another embodiment of the pet toy. As shown in FIG. 6, another embodiment of the pet toy 600 may comprise: a base 605, a return coil 610, a roller assembly 615, and a flexible sheet 650. The base 605 is configured to mount onto a vertical surface (e.g. wall) or horizontal surface (e.g., ledge) and is adapted to hold and rotatably secure the roller assembly 615. The roller assembly 615 is adapted to hold and secure the flexible sheet 650, such that the roller assembly 615 is rotatably secured to the base 605. Preferably, the flexible sheet 650 hangs or is suspended below the base 605. The return coil 610 may be housed within the cover 612 of the base 605, and is preferably configured to provide biasing to rotate the roller assembly 615 back to its original position.

Unlike the embodiment shown in FIGS. 1 to 5, the main roller 616 of the roller assembly 615 may comprise a plurality of holes 628 and a plurality of teeth 627 adapted to engage with the plurality of holes 628. The teeth 627 are preferably disposed along the underside of the flap 625 and are adapted to engage with the holes 628 of the main roller 616. This will preferably help secure the flexible sheet 650 onto the roller assembly 615 when the flexible sheet 650 is pulled by the pet. The flexible sheet 650 may also comprise a plurality of holes 629 that are adapted to align with the teeth 627 and holes 628 of the roller assembly 615. The holes 629 of the flexible sheet are preferably configured to secure onto the roller assembly 615 when the flap 625 of the roller assembly is closed or secured.

Figure 7:
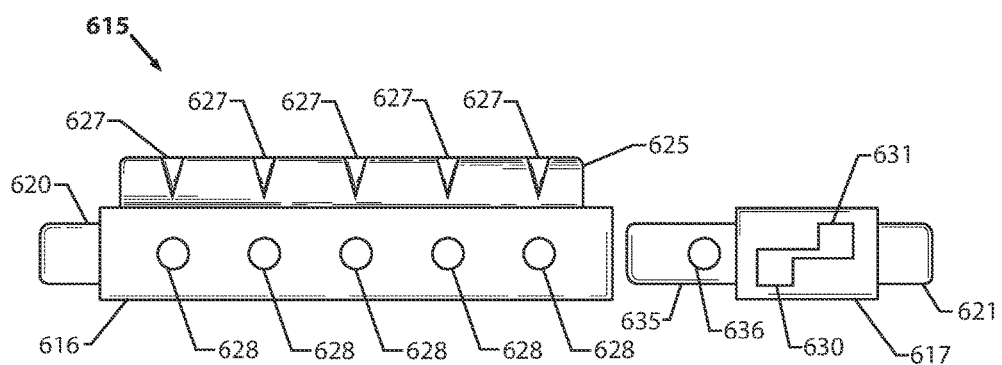
FIG. 7 is a front view of another embodiment of the roller assembly.

FIG. 7 is a front view of another embodiment of the roller assembly. As shown in FIG. 7, another embodiment of the roller assembly 615 may comprise a main roller 616 and a roller stub 617. One end of the main roller 616 is preferably adapted to matingly engage with one end of the roller stub 617 by mating a protrusion 635 of the roller stub 617 into the main roller 616. The roller stub 617 may also be secured into the main roller 616 by inserting a locking pin into a hole in the main roller 616 and hole 636 of the roller stub 617. The main roller 616 and the roller stub 617 may also comprise a cylindrical portions 620, 621 protruding on the sides of the main roller 616 and the roller stub 617. The cylindrical portions 620, 621 are preferably adapted to engage with the receiving portion of the arm portions 106, 107, 606, 607 of the base 105, 605.

FIG. 7 also shows that the flap 625 of the main roller 616 may also comprise a plurality of teeth 627, which are disposed along the underside of the flap 625. As discussed above in FIG. 6, the teeth 627 are preferably adapted to engage with the holes 628 of the main roller 616 to help secure the flexible sheet 650 onto the roller assembly 615.

Finally, FIG. 7 shows that the roller stub 617 may comprise one or more openings 630, 631 that are preferably adapted to engage with the return coil 610. Specifically, the openings 630, 631 are preferably used to insert and retain an end portion of the return spring. For instance, in one embodiment, opening 630 may be used to insert one end of the return coil 610 while the opening 631 may be used to insert the other end of the return coil 610.

Figure 8:
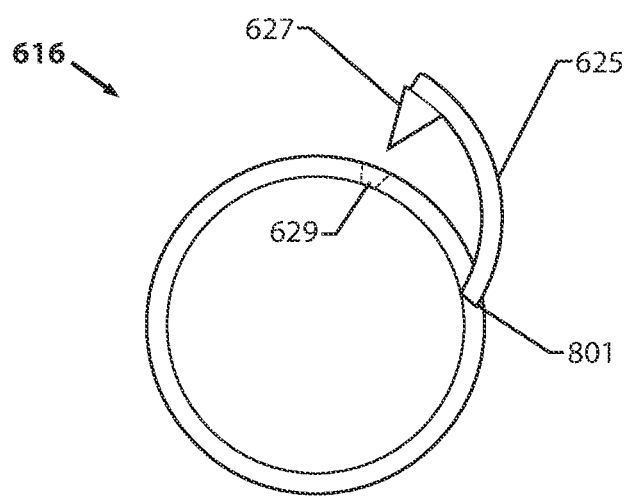
FIG. 8 is a side view of another embodiment of the main roller.

FIG. 8 is a side view of another embodiment of the main roller. As shown in FIG. 8, another embodiment of the main roller 616 may comprise a flap 625, teeth 627, holes 628, and a hinge 801. The hinge 801 preferably allows the flap 625 to swing or open/close. As the hinge 801 closes, the teeth 627 preferably engages with the holes 628 of the main roller 616. FIG. 8 shows that hinge 801 is a crimped living hinge.

Figure 9:
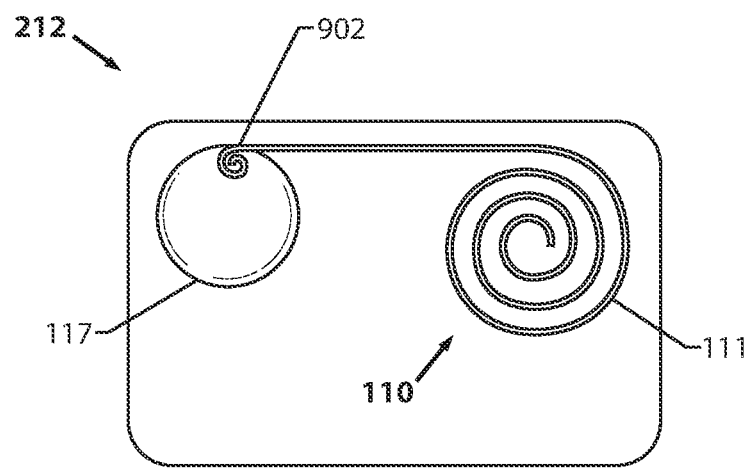
FIG. 9 is a side cross section view of one embodiment of the cover for housing said return coil

FIG. 9 is a side cross section view of one embodiment of the cover for housing the return coil. As shown in FIG. 9, one embodiment of the cover 212 may comprise a return coil 110, which may be coupled to the roller stub 117 of the roller assembly 116. Specifically, one end 902 of the return coil 110 may be coupled or attached to the roller stub 117 while the remaining portion of the return coil 110 is preferably housed within the interior portion of the cover 212.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. The invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope of the invention. It is intended that the scope of the invention not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A pet toy, comprising:
a base;
a roller assembly;
a return coil; and
a flexible sheet;
wherein said base portion is configured to engage with said roller assembly, such that said roller assembly is rotatably held by said base;
wherein said roller assembly is configured to securely hold said flexible sheet, such that said flexible sheet, when pulled by a pet, causes said roller assembly to rotate;
wherein said return coil is connected to said base and said roller assembly, such that said return coil allows said roller assembly to rotate and then return to a resting position after being released by said pet;
wherein said return coil limits how far said roller assembly rotates when pulled by said pet;
wherein said flexible sheet cannot be removed by said pet; and
wherein said return coil dynamically springs back in an unpredictable manner when said flexible sheet is engaged by said pet, which causes said pet to stay engaged with said pet toy.

2. The pet toy of claim 1, wherein said base comprises a first arm portion and a second arm portion disposed in parallel relation;
wherein said first arm portion comprises a first receiving cavity;
wherein said second arm portion comprises a second receiving cavity;
wherein said first receiving cavity is adapted to engage with a first end of said roller assembly and wherein said second receiving cavity is adapted to engage with a second end of said roller assembly, such that said first arm portion and said second arm portion are adapted to hold and rotatably secure said roller assembly;
wherein said roller assembly comprises a flap hingedly coupled to an outer curved surface of said roller assembly;
wherein said flap is adapted to grasp a portion of said flexible sheet; and
wherein said return coil is adapted to bias and rotate said roller assembly back towards its original position when said roller assembly is rotated when said flexible sheet is pulled.

3. The pet toy of claim 2, wherein said roller assembly comprises a plurality of teeth disposed along an underside of said flap;
wherein said plurality of teeth is adapted to engage said flexible sheet.

4. The pet toy of claim 2, wherein said flexible sheet comprises a plurality of holes adapted to receive said plurality of teeth of said roller assembly; and
wherein, when said flap of said roller assembly is closed and when said plurality of teeth is engaged with said plurality of holes of said flexible sheet, said flexible sheet is coupled and secured to said roller assembly.

5. The pet toy of claim 2, wherein said roller assembly comprises a slot;
wherein said flap comprises a lip; and
wherein said lip is adapted to engage with said slot when said flap is closed.

6. The pet toy of claim 2, wherein said roller assembly further comprises: a main roller and a roller stub;
wherein said main roller is adapted to engage with said roller stub; and
wherein said roller stub is adapted to couple with said return coil.

7. The pet toy of claim 6, wherein said roller assembly further comprises a locking mechanism;
wherein said locking mechanism is adapted to secure said main roller to said roller stub.

8. The pet toy of claim 2, wherein said second arm portion of said base comprises a cover for housing said return coil.

9. The pet toy of claim 6, wherein said roller stub comprises a cover for housing said return coil.

10. The pet toy of claim 2, wherein said base comprises one or more fastener holes;
wherein said one or more fastener holes are adapted to receive one or more fasteners for mounting said base to a surface.

11. The pet toy of claim 2, wherein said base comprises a U-shaped clamp portion and a clamping screw;
wherein said clamp portion and clamping screw are adapted to clamp said base onto an edge of a surface.

12. A pet toy, comprising:
a base;
a roller assembly;
a return coil; and
a flexible sheet;
wherein said base comprises a first arm portion and a second arm portion disposed in parallel relation;
wherein said first arm portion comprises a first receiving cavity;
wherein said second arm portion comprises a second receiving cavity;
wherein said first receiving cavity is adapted to engage with a first end of said roller assembly and wherein said second receiving cavity is adapted to engage with a second end of said roller assembly, such that said first arm portion and said second arm portion are adapted to hold and rotatably secure said roller assembly;
wherein said roller assembly comprises a flap hingedly coupled to an outer curved surface of said roller assembly;
wherein said flap is adapted to grasp and hold a portion of said flexible sheet; and
wherein said return coil is coupled to said base and said roller assembly and is adapted to bias and rotate said roller assembly back towards its original position when said roller assembly is rotated by a pet;
wherein said return coil limits how far said roller assembly rotates when pulled by said pet;
wherein said flexible sheet cannot be removed by said pet; and wherein said return coil dynamically springs back in an unpredictable manner when said flexible sheet is engaged by said pet, which causes said pet to stay engaged with said pet toy.

13. The pet toy of claim 12, wherein said roller assembly further comprises a plurality of teeth disposed along an underside of said flap;
   wherein said plurality of teeth is adapted to engage said flexible sheet.

14. The pet toy of claim 13, wherein said flexible sheet comprises a plurality of holes adapted to receive said plurality of teeth of said roller assembly;
   wherein said plurality of holes are disposed in a configuration substantially similar to said plurality of teeth, such that said plurality of teeth directly and matingly engages with said plurality of holes; and
   wherein, when said flap of said roller assembly is closed and when said plurality of teeth is engaged with said plurality of holes of said flexible sheet, said flexible sheet is coupled and secured to said roller assembly.

15. The pet toy of claim 12, wherein said roller assembly comprises a slot;
   wherein said flap comprises a lip; and
   wherein said lip is adapted to engage with said slot when said flap is closed.

16. The pet toy of claim 14, wherein said roller assembly further comprises: a main roller and a roller stub;
   wherein said flap is hingedly coupled to said main roller;
   wherein said main roller is adapted to engage with said roller stub; and
   wherein said roller stub is adapted to couple with said return coil.

17. The pet toy of claim 15, wherein said roller assembly further comprises a locking pin;
   wherein said locking pin is adapted to secure said main roller to said roller stub.

18. The pet toy of claim 12, wherein said base comprises one or more fastener holes;
   wherein said one or more fastener holes are adapted to receive one or more fasteners in order to mount said base to a surface.

19. The pet toy of claim 11, wherein said base comprises a U-shaped clamp portion and a clamping screw;
   wherein said U-shaped clamp portion and clamping screw are adapted to clamp said base onto an edge of a surface.

20. The pet toy of claim 11, wherein said flexible sheet is removable and reattachable.

* * * * *